Figure 1:
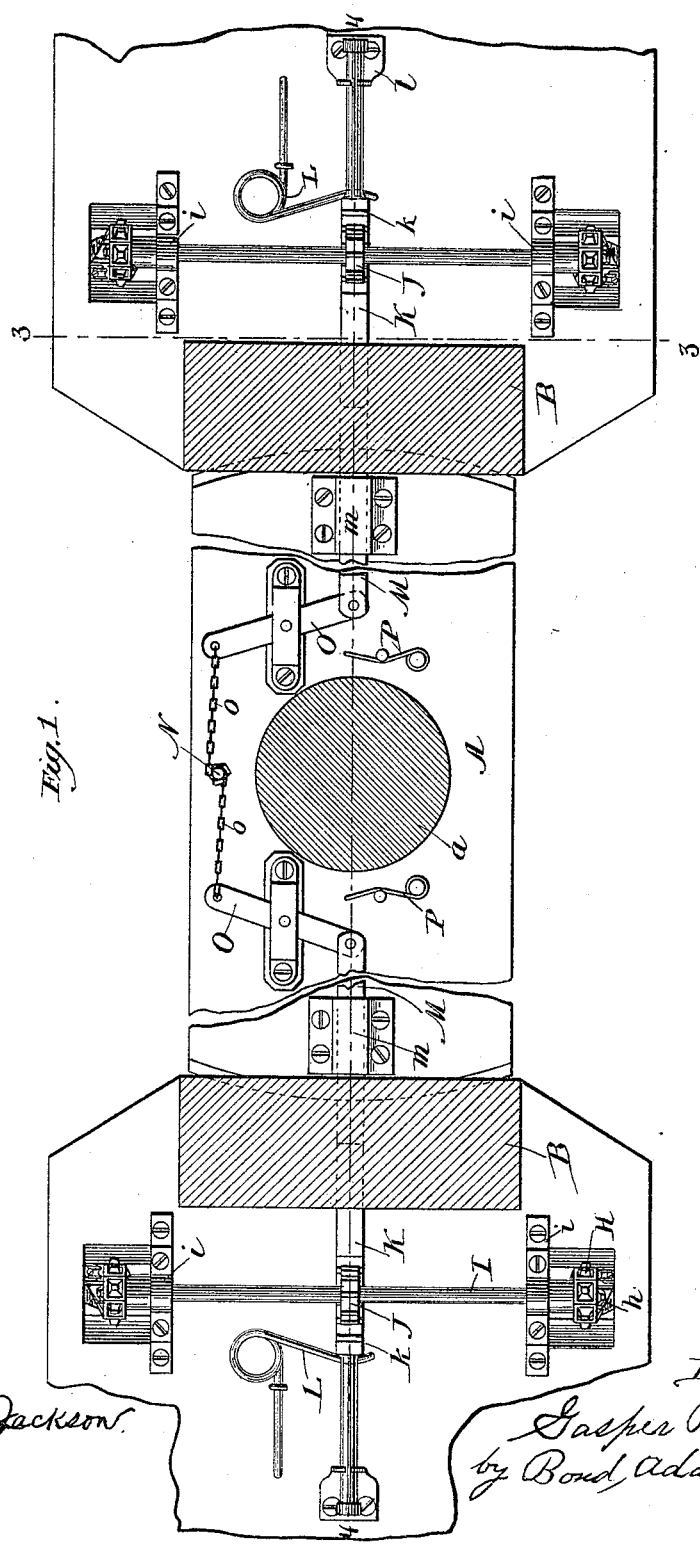

(No Model.) 4 Sheets—Sheet 1.

G. R. RATTO.
GATE FOR SWING BRIDGES.

No. 440,368. Patented Nov. 11, 1890.

Witnesses:
John L. Jackson.
Lute Alter.

Inventor:
Gasper R. Ratto
by Bond, Adams & Jones
attys.

THE NORRIS PETERS CO., PHOTO-LITHO., WASHINGTON, D. C.

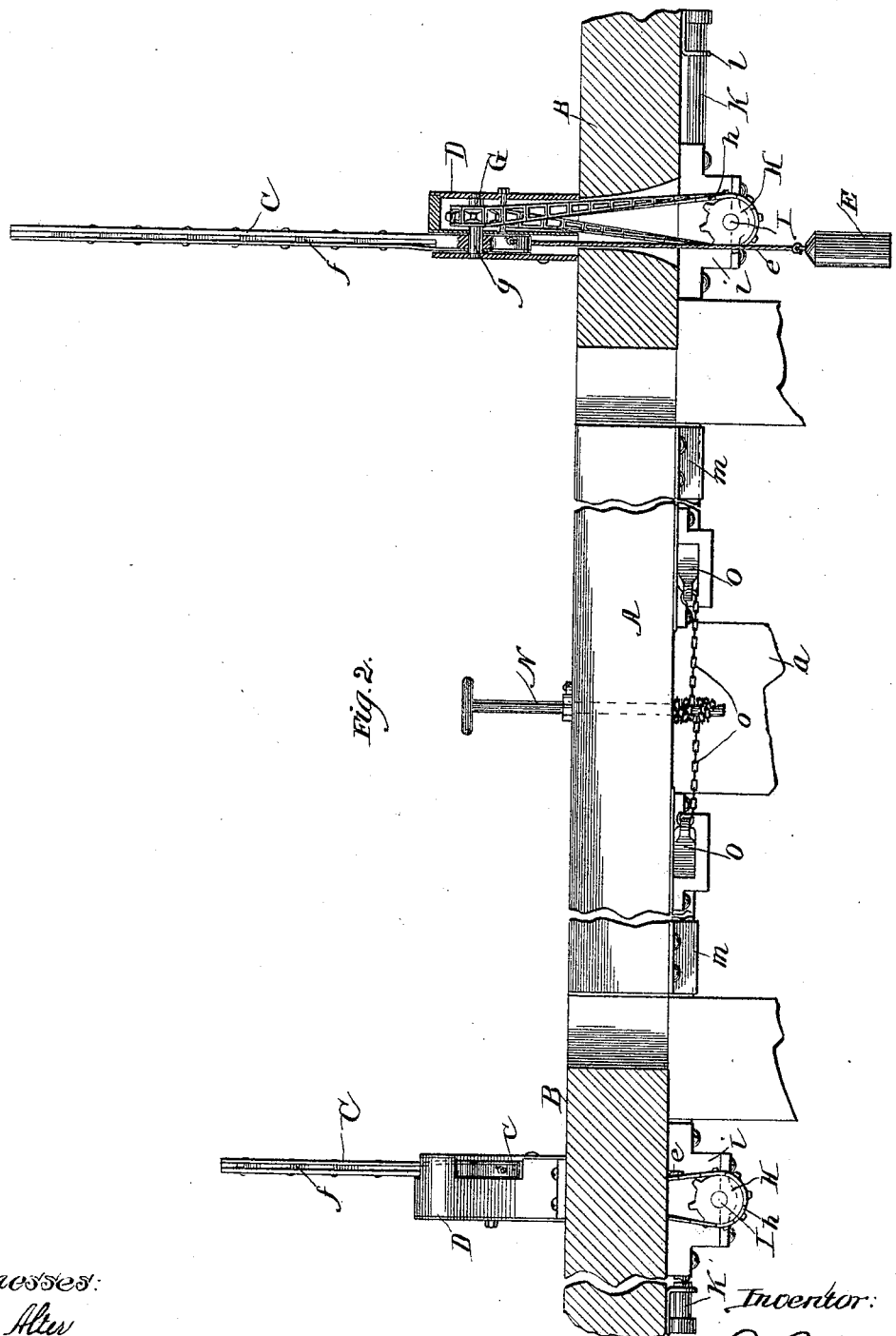

(No Model.) 4 Sheets—Sheet 3.
G. R. RATTO.
GATE FOR SWING BRIDGES.
No. 440,368. Patented Nov. 11, 1890.
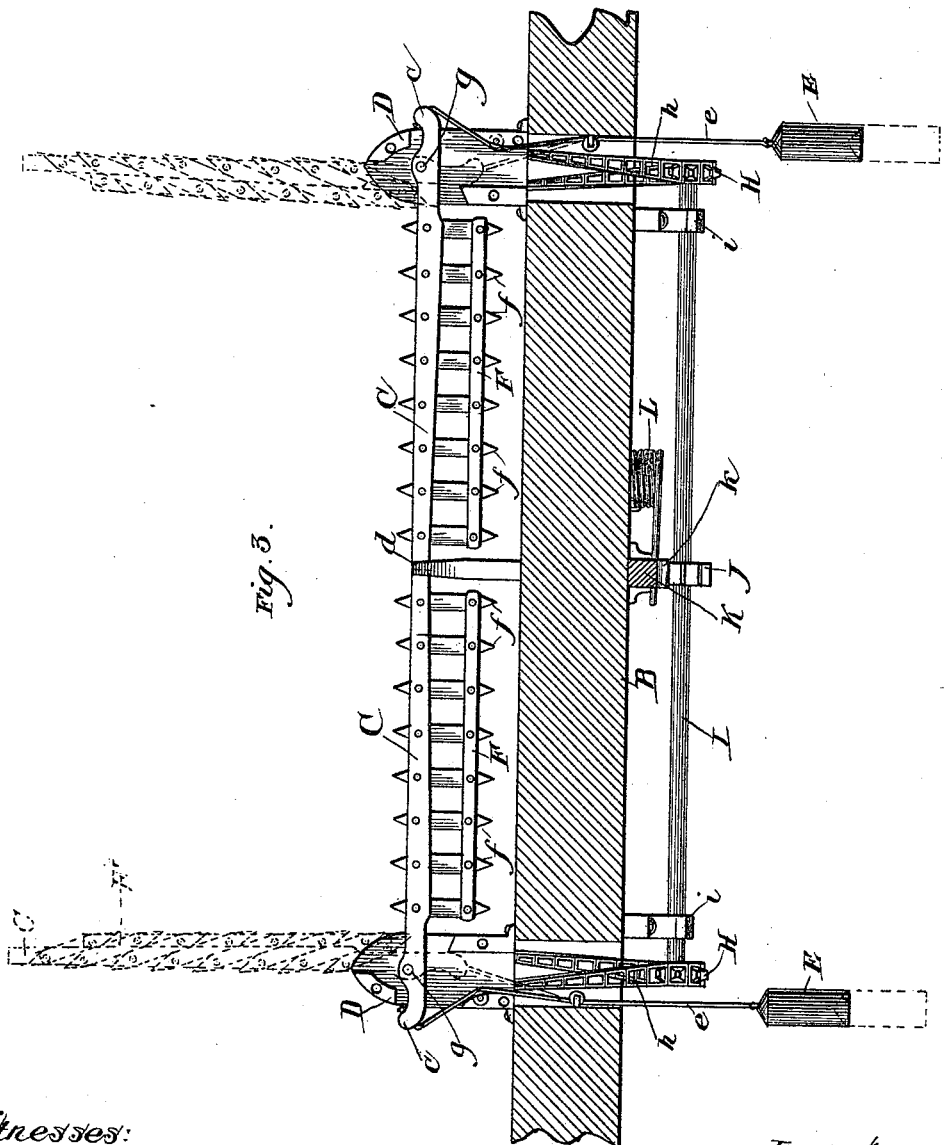
Witnesses:
John L. Jackson
Lute Alter
Inventor:
Gasper R. Ratto
by Bond, Adams & Jones
attys.

(No Model.) 4 Sheets—Sheet 4.
G. R. RATTO.
GATE FOR SWING BRIDGES.
No. 440,368. Patented Nov. 11, 1890.
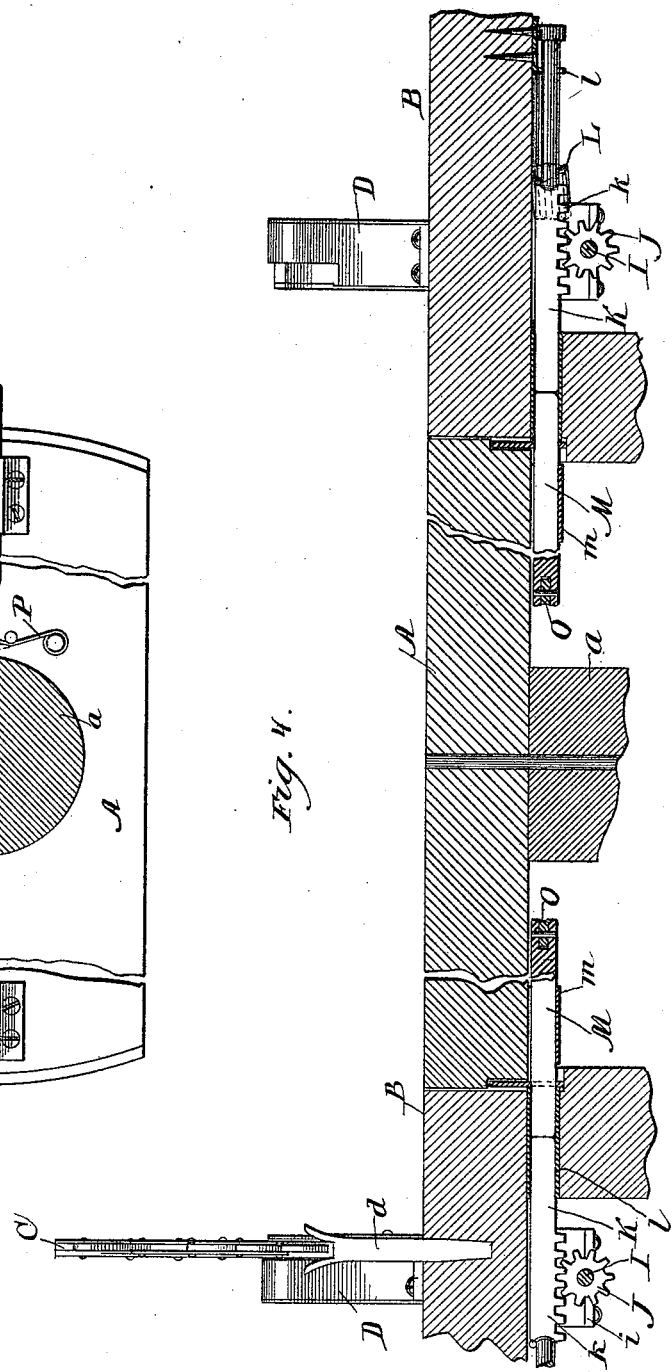
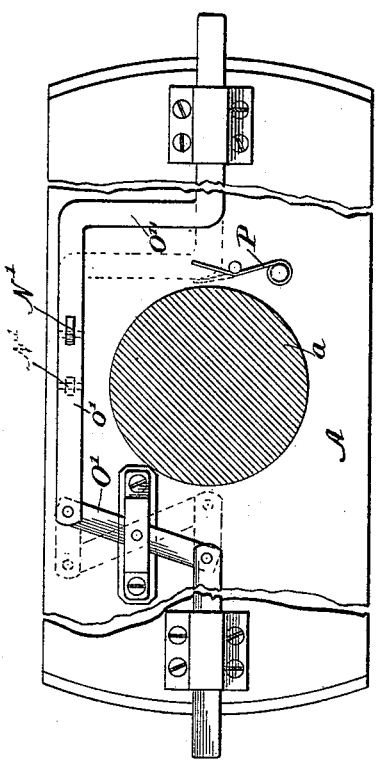
Witnesses:
Lute Alter
John L. Jackson
Inventor:
Gasper R. Ratto
by Bond, Adams & Jones
attys.

UNITED STATES PATENT OFFICE.

GASPER R. RATTO, OF CHICAGO, ILLINOIS.

GATE FOR SWING-BRIDGES.

SPECIFICATION forming part of Letters Patent No. 440,368, dated November 11, 1890.

Application filed July 24, 1890. Serial No. 359,836. (No model.)

*To all whom it may concern:*

Be it known that I, GASPER R. RATTO, residing at Chicago, in the county of Cook and State of Illinois, and a citizen of the United States, have invented a new and useful Improvement in Gates for Swing-Bridges, of which the following is a specification, reference being had to the accompanying drawings, in which—
Figure 1 is an under side view. Fig. 2 is a side elevation. Fig. 3 is a section at line 3 3 of Fig. 1. Fig. 4 is a longitudinal section at line 4 4 of Fig. 1, and Fig. 5 is an under side view showing a modification.
The object of this invention is to provide improved devices for opening and closing gates on the approaches of a swing-bridge by devices operated from the swing-bridge, which I accomplish as illustrated in the drawings and as hereinafter described.

That which I claim as new will be pointed out in the claims.

In the drawings, A represents a swing-bridge, which is supported upon a pier $a$.
B B are the approaches.

C C are gates, which are mounted upon posts D and arranged to swing across the roadway.

The devices on each of the two approaches and at each end of the bridge are alike, and I will therefore describe those on one approach and at one end of the bridge only. When there is a double roadway, there may be two gates on each approach, each supported upon a pivot $g$ in a post D at one end, and when closed their swinging ends may be supported upon a post $d$, as shown in Fig. 3. When there is a single roadway, one gate will be sufficient.
E is a weight suspended by a rope or cable $e$ from the short arm $c$ of the swinging gate C.

F is a bar which is supported from the gate C by a number of slats $f$, which are pivoted to both the gate C and bar F, as best shown in Fig. 3.

G (see Fig. 2) is a sprocket-wheel secured upon the axle $g$.

H is a sprocket-wheel which is secured upon a shaft I. A drive-chain $h$ connects the sprocket-wheel G with the sprocket-wheel H.

The shaft I is supported in suitable bearings $i$ beneath the bridge-approach B.

J is a pinion secured upon the shaft I.

K is a sliding bar supported in suitable guides $l$ in the bridge-approach B. It is provided with a rack $k$, arranged to engage with the pinion J.

L is a spring arranged to press the bar K outwardly. Various forms of springs L may be used, and in some cases a weight may be used in place of the spring.

M is a sliding bar supported in suitable bearings $m$ beneath the roadway of the bridge and arranged to enter the guide $l$ and engage with the end of the sliding bar K, as shown in Figs. 1 and 4.

N is a hand-wheel and shaft supported on the bridge in a convenient position to be operated by the bridge-tender.

O O (see Figs. 1 and 2) are two levers—one at each end of the bridge—each of which is connected at one end with the bar M at that end of the bridge, and at its other end is connected with the shaft N by a chain $o$. The levers O and chains $o$ form the connection between the sliding bars M and the shaft N. This connection between the sliding bars and the operating device may be greatly varied.

In Fig. 5 I have shown a lever N', which is connected with one of the sliding bars M by a link $o'$ and lever O', and with the other bar M by a bent link O''.

P P are springs arranged to press the bars M outwardly—that is, toward the abutments.

When the bridge is closed, the operator forces the sliding bars M outwardly against the sliding bars K by means of the hand-wheel or lever and the connecting devices. As the sliding bar K is forced backwardly, its rack $k$ rotates the pinion J and shaft I, and through the sprocket-wheels H and G and drive-chain $h$ raises the gate or gates C. This locks the bridge closed.

When the operator wishes to open the bridge, he releases the hand-wheel or lever, which allows the spring L to force the sliding bars K M back until the sliding bar M is clear of the abutment B, when the bridge can be opened. As the bar K returns, as above described, its rack $k$ rotates the pinion J, shaft

I, and sprocket-wheels H and G, and allows the gate C to be swung across the roadway. By thus forcing the sliding bar K back by the sliding bar M the gate is opened, and by withdrawing the bar M the gate is allowed to close. The bar M also serves the purpose of a lock for the bridge, as the bridge cannot be opened while the sliding bar M is in the recess in the abutment B, so that the bridge-tender must close the gate before he can commence to open the bridge, and must force the bar M into the abutment to open the gate, thereby locking the bridge closed.

The weight E counterbalances the gate C, so that it can be opened with very little force, and so that the spring L will close it.

The bar F and slats $f$, which are suspended from the gate C, hang in the position shown in Fig. 3 when the gate is down or closed; but when the gate is opened or raised to its vertical position the bar F will drop into the position indicated by dotted lines in Fig. 3. This construction affords a high guard across the roadway when the gate is closed, and when the gate is open it occupies but little space, and will not interfere with traffic over the bridge.

What I claim as new, and desire to secure by Letters Patent, is—

1. The combination, with a sliding bar in a guide in the abutment, a spring normally acting to press the bar K outward, a vertically-swinging gate normally closed, and gearing between said bar and gate, of a swing-bridge and sliding bar thereon adapted to enter the guide and engage the bar K for raising the gate, substantially as and for the purpose specified.

2. The combination, with a swing-bridge and a sliding bar M thereon, of a sliding bar K, having a rack $k$, pinion J, shaft I, sprocket-wheels H and G, chain $h$, and gate C, substantially as and for the purpose specified.

GASPER R. RATTO.

Witnesses:
HARRY T. JONES,
JOHN L. JACKSON.